Feb. 24, 1953     N. F. TOADVINE     2,629,397
AUTOMATIC WATER VALVE
Filed March 3, 1950
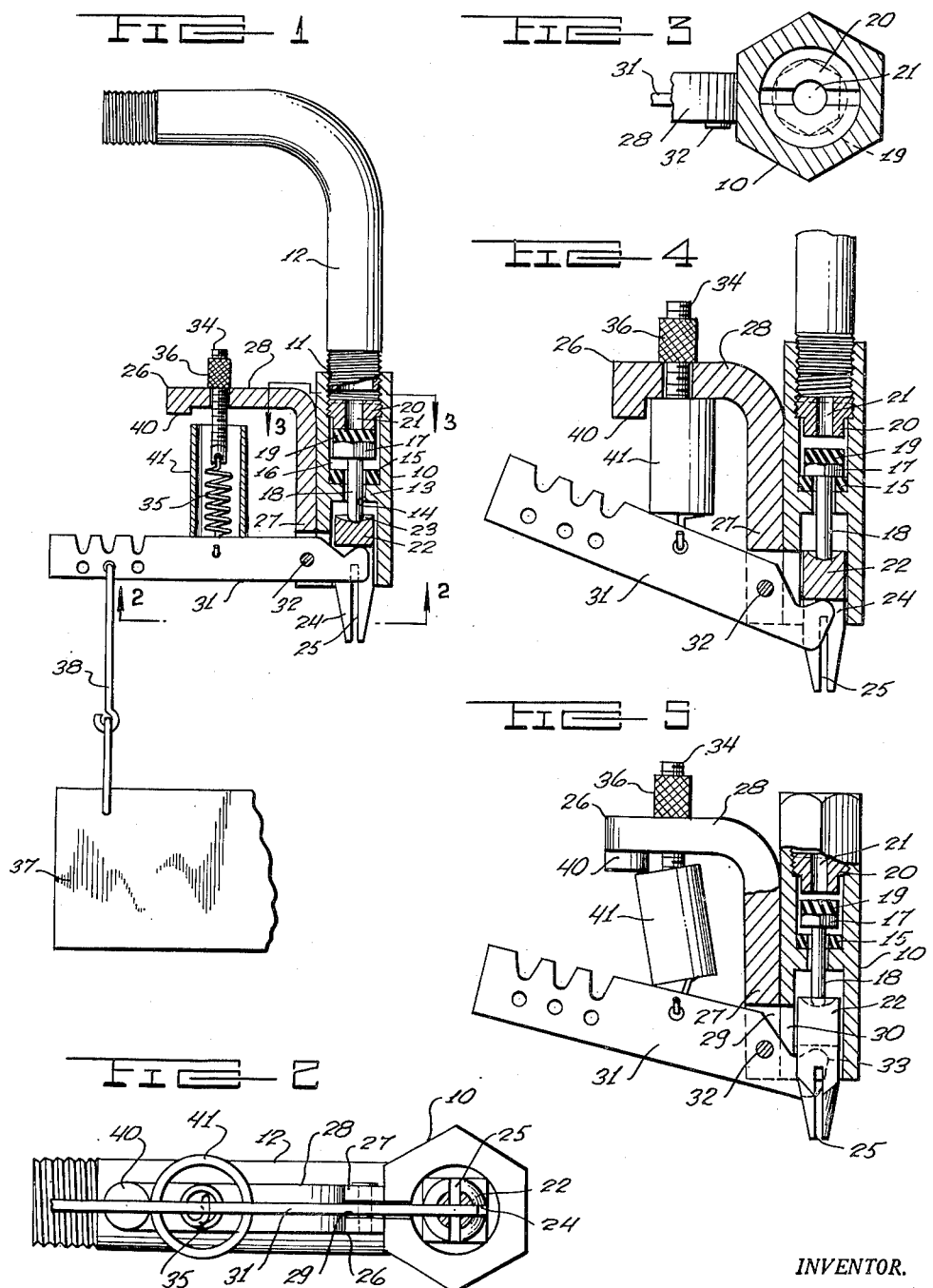
INVENTOR.
NORMAN F. TOADVINE
BY
McMorrow, Berman & Davidson
ATTORNEYS Patented Feb. 24, 1953

2,629,397

UNITED STATES PATENT OFFICE 2,629,397

AUTOMATIC WATER VALVE

Norman F. Toadvine, Salisbury, Md.

Application March 3, 1950, Serial No. 147,403

4 Claims. (Cl. 137—408)

This invention relates to automatic water valves, more particularly to an automatic valve for regulating the flow of water into a poultry watering trough, and constitutes a continuation in part of my pending applications Serial No. 104,183, filed July 12, 1949, now Patent Number 2,541,622, patented February 13, 1951, and No. 112,531, filed August 26, 1949.

It is among the objects of the present invention to provide an improved valve of simplified construction which is operative to suspend a receptacle, such as a watering trough or pan, and cut off the flow of water when the receptacle is full and also when the receptacle is empty or detached from the valve, which has manually settable means for holding the valve open while an empty receptacle is being filled, such means being automatically released to restore the valve to automatic operation when a predetermined quantity of water has been supplied to the receptacle, which includes an improved and simplified valve piston assembly which is effective to positively cut off the flow of water in either one of two operative positions of the assembly, direct the water into the receptacle without spraying or splashing and is not subject to leakage or other malfunctioning in use, and which valve is economical to manufacture, easy to install, is easily adjustable to vary the quantity of water maintained in the receptacle, and can be substituted for existing valves now in use.

Other objects and advantages will become apparent from a consideration of the following description and the appended claims in conjunction with the accompanying drawing wherein:

Figure 1 is a longitudinal, medial cross sectional view of a valve illustrative of the invention, the valve being shown connected to a water conduit and suspending a watering pan, fragmentarily illustrated;

Figure 2 is a cross sectional view on the line 2—2 of Figure 1;

Figure 3 is a cross sectional view on the line 3—3 of Figure 1;

Figure 4 is a cross sectional view of the valve assembly similar to Figure 1 but showing the valve parts in a different operative position from that illustrated in Figure 1; and Figure 5 is a cross sectional view similar to Figures 1 and 4 but showing the valve parts in a still different operative position from that illustrated in Figures 1 and 4.

With continued reference to the drawing, the numeral 10 indicates an elongated valve body of tubular form which is illustrated as being hexagonal in external shape with a cylindrical bore extending longitudinally and substantially coaxially therethrough. At one end the valve body 10 is internally screw threaded, as indicated at 11, to receive the externally screw threaded end of the water conduit elbow 12. Intermediate its length the valve body is provided internally with an annular projection 13 which surrounds a central orifice 14 and provides at its side adjacent the screw threads 11 an annular shoulder. A washer 15 of resilient material is seated on the shoulder provided by the internal projection 13 and this washer has a central aperture which registers with the orifice 14.

A valve plunger 16 has a head 17 which contacts the washer 15 at the side of the latter opposite the internal projection 13 to cut off the flow of water through the valve when the valve parts are in the operative position illustrated in Figure 4. This valve plunger also has a stem or shank 18 which extends through the aperture in the washer 15 and through the orifice 14 and into the bore of the valve body at the side of the projection 13 opposite the washer 15. This stem is smaller than the aperture in the washer and in the orifice 14 so that water can flow through the aperture and the orifice past the valve stem.

A solid disc 19 of resilient material is disposed at the side of the plunger head 17 opposite the washer 15 and a screw plug 20 is threaded into the screw threaded end of the valve body and provides at its inner end a valve seat for the disc 19. This screw plug has a bore 21 extending longitudinally therethrough and providing a passage for water from the conduit 12 into the valve body 10.

When the valve plunger 16 is in the operative position illustrated in Figure 1, the disc 19 is pressed against the inner end of the plug 20 and cuts off the flow of water through the valve. When the plunger head is in the operative position illustrated in Figure 5, the disc 19 is spaced from the inner end of the screw plug 20 and the plunger head 17 is spaced from the washer 15, the disc 19 and the plunger head 17 being somewhat smaller than the bore in the valve body so that water can flow from the passage 21 past the disc 19 and the plunger head 17 and thence through the washer 15 and the orifice 14 past the plunger stem 18 and out of the end of the valve body 10 opposite the internally screw threaded end of the valve body.

A bolt 22, smaller than the bore in the valve body 10, is disposed in the valve body bore at the side of the extension 13 opposite the internally screw threaded end of the valve body and this bolt is provided in its end adjacent the projection 13 with a concave formation 23 which receives the adjacent end of the valve plunger stem 18. The bolt is tapered substantially to a point at its opposite end and is provided with two transversely extending slots 24 and 25 which are disposed at right angles to each other and extend longitudinally of the bolt from the pointed end of the latter to locations adjacent the mid-length location of the bolt, the slot 24 being materially deeper than the slot 25, as is clearly illustrated in Figure 1.

An angle bracket 26 has one leg 27 secured to the side of the valve body 10 and extending longitudinally from the valve body substantially from one end to the other of the latter, and has its other leg 28 projecting substantially perpendicularly from the valve body at the screw threaded end of the latter. The leg 27 of the angle bracket is provided in its end opposite the leg 28 with a transversely extending notch or groove 29 and this groove or notch is continued through the adjacent portion of the wall of the valve body 10, as indicated at 30.

A lever arm 31 is received in the openings 29 and 30 and pivotally connected intermediate its length to the angle bracket 26 by a pivot pin 32. This lever extends at one end into the bore of the valve body and is provided in its upper edge with a notch and with a rounded end portion 33 of reduced width, this end portion being received in the slot 24 of the bolt 22 with the rounded edge bearing against the bottom of this slot.

With this construction, when the outer end of the lever 31 is pulled down the bolt 22 will be forced upwardly, moving the valve plunger 16 to force the disc 19 against the adjacent end of the screw plug 20 and cut off the flow of water through the valve.

The arm 28 of the angle bracket is provided with an aperture and a screw threaded shank or stud 34 extends through this aperture. At its lower end the shank 34 is provided with an eye or aperture and a coiled tension spring 35 is connected between the apertured end of the shank 34 and the lever arm 31 intermediate the length of the latter. This spring tends to pull the outer end of the lever arm upwardly and its strength is adjusted by a nut 36 threaded onto the shank above the leg 28 of the angle bracket, that is, at the side of the leg 28 opposite the spring 35.

When the spring 35 pulls the outer end of the lever arm 31 upwardly, the pressure exerted by the rounded or inner end of the lever arm on the bolt 22 is released and the pressure of the water flowing through the valve then forces the plunger 16 downwardly until the plunger head 17 contacts the upper side of the washer 15 cutting off the flow of water through the valve.

The watering trough 37 is suspended from the outer end of the lever arm 31 by a bail 38 which extends through a suitable aperture or notch in the lever arm and, when the quantity of water in the trough 37 is within predetermined limits, the lever arm 31 will be held by the spring 35 in an intermediate position, such as that illustrated in Figure 5, wherein the disc 19 is spaced from the screw plug 20 and the plunger head 17 is spaced from the washer 15 thereby allowing the flow of water through the valve and into the watering trough.

The concave recess 23 provides a deflector for a stream of water flowing along the stem 18, reducing the velocity of this stream of water so that the water will flow slowly and uniformly through the space between the bolt 22 and the inner surface of the housing wall. After the water reaches the tapered end of the bolt 22 it will flow inwardly also entering the slots 24 and 25 as it flows downwardly. Thus this shape of bolt produces a solid stream of water flowing at low velocity from the lower smaller end of the bolt which stream will fall directly into the trough 37. This prevents the stream from spraying or splashing outside of the water receiving trough.

A lug 40 is provided on the under side of the angle bracket leg 28 at the outer end of the latter and a tubular sleeve 41 surrounds the spring 35 between the lever arm 31 and the bracket leg 28. This sleeve has a length such that when its upper end is placed under the lug 40 it will hold the lever arm 31 in the position illustrated in Figure 5 permitting flow of water through the valve into the pan 37. When a predetermined amount of water has been supplied to the trough the lever 31 is pulled down and the sleeve 41 rocks to a position in which it will not again contact the lug 40 until manually set to do so. This permits holding the valve open to fill an empty trough or receptacle and restoring the valve to automatic operation when a predetermined amount of water has been supplied to the receptacle.

The entire valve construction has been greatly simplified so that it is easier and more economical to manufacture and does not require any union nut in order to attach it to the water conduit elbow. At the same time, the positive action and operating efficiency and general convenience of the valve has in no way been sacrificed and the durability has been improved.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meeting and range of equivalency of the claims are, therefore, intended to be embraced therein.

What is claimed is:

1. In an automatic valve for controlling the flow of water to a receptacle suspended from the valve, an elongated tubular valve body having internal screw threads at one end for receiving the screw threaded end of a water conduit and an annular projection internally and intermediate the length thereof, said projection surrounding a central orifice and providing an annular shoulder at the side thereof adjacent the screw threaded end of said valve body, a washer of resilient material seated on said annular shoulder and having an aperture therein in registry with said orifice, a valve plunger having a head disposed at the side of said washer opposite said annular projection and a stem extending from said head through said aperture and said orifice, said stem being smaller than said aperture and said orifice to permit the passage of water through said aperture and said orifice along said stem, a solid disc of resilient material at the side of said valve head opposite said washer, a screw plug threaded into the screw threaded end of said body and having a bore therethrough, said disc contacting said screw plug to cut off the flow of water through said valve when said valve plunger is in one operative position and said plunger head contacting said washer to cut off the flow of water through said valve when said valve plunger is in a different operative position, a bolt slidably mounted in said valve body at the side of said internal projection opposite the screw threaded end of said body, said bolt having at one end a concave formation receiving the adjacent end of said plunger stem and being tapered toward its other end and provided in its tapered portion with a transversely extending slot, an angle bracket having one leg secured to said valve body and extending longitudinally thereof with the other leg of said bracket projecting outwardly from said body at the screw threaded end of the latter, a lever arm pivotally secured to said angle bracket at the end of said valve body opposite said screw threaded end and having one end received in the slot in said bolt, and a tension spring connected between said lever arm and said other leg of the angle bracket to exert a lifting force on said lever arm to close said valve in one direction, said valve being closed in the opposite direction by the weight of water in a receptacle suspended from said lever arm.

2. In an automatic valve for controlling the flow of water to a receptacle suspended therefrom, an elongated valve body having a bore extending therethrough and provided at one end with screw threads, an annular extension within said body intermediate the length of the latter, said extension surrounding a central orifice and providing an annular shoulder at the side thereof adjacent said screw threads, a washer of resilient material supported on said annular shoulder, a screw plug threaded into the screw threaded end of said valve body and having a bore therethrough, a disc of resilient material at the inner end of said screw plug, a valve plunger having a head disposed between said washer and said disc for closing said valve in either of two operative positions of said plunger, said plunger also having a shank extending from said head through said washer and through said orifice, and means carried by said valve body and engaging the end of said plunger shank opposite said head for moving said plunger between said two operative positions, said means including a bolt slidably mounted in said valve body at the side of said internal projection opposite said screw threads and engaging the adjacent end of said plunger shank.

3. In an automatic valve for controlling the flow of water to a receptacle suspended therefrom, an elongated valve body having a bore extending therethrough and provided at one end with screw threads, an annular extension within said body intermediate the length of the latter, said extension surrounding a central orifice and providing an annular shoulder at the side thereof adjacent said screw threads, a washer of resilient material supported on said annular shoulder, a screw plug threaded into the screw threaded end of said valve body and having a bore therethrough, a disc of resilient material at the inner end of said screw plug, a valve plunger having a head disposed between said washer and said disc for closing said valve in either of two operative positions of said plunger, said plunger also having a shank extending from said head through said washer and through said orifice, and means carried by said valve body and engaging the end of said plunger shank opposite said head for moving said plunger between said two operative positions, said means including a bolt slidably mounted in said valve body at the side of said internal projection opposite said screw threads and engaging the adjacent end of said plunger shank, an angle bracket secured to said valve body, a lever arm pivotally connected intermediate its length to said angle bracket and engaging said bolt at one end, and a tension spring connected between said lever arm and said angle bracket at a location spaced from the side of the pivotal connection between said lever arm and said angle bracket opposite said one end of said lever arm.

4. A valve plunger operating bolt comprising an elongated body having a concave formation at one end and being tapered to its other end and having transversely disposed slots extending longitudinally of said body from said other end to at least the mid-length location of said body, said slots being disposed substantially perpendicular to each other and intersecting substantially along the longitudinal center line of said body.

NORMAN F. TOADVINE.

REFERENCES CITED

The following references are of record in the file of this patent:

UNITED STATES PATENTS

| Number | Name | Date |
| --- | --- | --- |
| 851,220 | Bowers | Apr. 25, 1907 |
| 963,842 | Williams | July 12, 1910 |
| 2,155,698 | Zinkil | Apr. 25, 1939 |
| 2,512,839 | Pruitt | June 27, 1950 |